United States Patent
Jones, IV et al.

(10) Patent No.: US 7,453,793 B1
(45) Date of Patent: Nov. 18, 2008

(54) CHANNEL ESTIMATION FOR OFDM COMMUNICATION SYSTEMS INCLUDING IEEE 802.11A AND EXTENDED RATE SYSTEMS

(75) Inventors: Vincent K. Jones, IV, Redwood City, CA (US); James Gardner, San Ramon, CA (US); D. J. Richard van Nee, De Meern (NL)

(73) Assignee: Qualcomm Incorporated, San Diego, CA (US)

( * ) Notice: Subject to any disclaimer, the term of this patent is extended or adjusted under 35 U.S.C. 154(b) by 528 days.

(21) Appl. No.: 10/823,087

(22) Filed: Apr. 12, 2004

Related U.S. Application Data

(60) Provisional application No. 60/462,286, filed on Apr. 10, 2003.

(51) Int. Cl.
*H04J 11/00* (2006.01)

(52) U.S. Cl. ........................... 370/203; 455/63.1

(58) Field of Classification Search ............ 455/63, 455/67.3, 63.1, 67.13; 375/354, 219, 222; 370/207, 210, 343, 203
See application file for complete search history.

(56) References Cited

U.S. PATENT DOCUMENTS

| | | | |
|---|---|---|---|
| 2002/0065047 A1* | 5/2002 | Moose | 455/63 |
| 2002/0111142 A1* | 8/2002 | Klimovitch | 455/63 |
| 2003/0076777 A1* | 4/2003 | Stuber et al. | 370/206 |
| 2004/0105512 A1* | 6/2004 | Priotti | 375/340 |
| 2004/0120428 A1* | 6/2004 | Maltsev et al. | 375/341 |

OTHER PUBLICATIONS

"Part 11: Wireless LAN Medium Access Control (MAC) and Physical Layer (PHY) specifications, High-speed physical layer in the 5Ghz Band" IEEE Std. 802.11-1999, Supplement to IEEE Standard for Information 802.11a—1999 Adopted by ISO/IEC and redesignated as ISO/IEC 8802-11:1999/Amd 1:2000 E.

* cited by examiner

*Primary Examiner*—Tu Nguyen
(74) *Attorney, Agent, or Firm*—Amin, Turocy & Calvin, LLP

(57) ABSTRACT

Channel estimation techniques are provided for a receiver of a wireless communication system using orthogonal frequency division multiplexing (OFDM), including legacy 802.11a and various extended rate systems. Training signals are received from one or more receive antennas. An estimated channel impulse response is computed from the received training signals by reference to a training sequence. The estimated channel impulse response is truncated in the time domain based on channel power and noise data. Channel response tracking techniques may also be implemented to correct for variations in channel response over the transmission time of a packet.

73 Claims, 8 Drawing Sheets

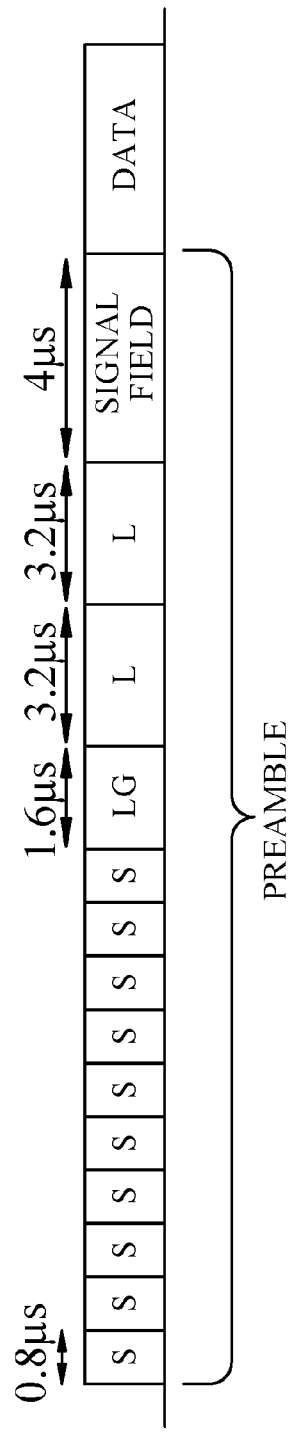

L2 = { 0   1  -1  -1   1   1  -1   1  -1   1  -1  -1  -1  -1  -1   1
       1  -1  -1   1  -1   1  -1   1   1   1   1  -1  -1  -1   1  -1
      -1  -1   1   1   1   1   1   1  -1  -1   1   1  -1   1  -1   1
       1   1   1   1   1  -1  -1   1   1  -1   1  -1   1   1   1   1}

L3 = { 0   1  -1  -1  -1  -1   1  -1  -1   1  -1  -1   1   1   1  -1
       1  -1  -1   1   1  -1   1  -1   1   1   1  -1   1   1  -1   1
      -1  -1   1   1  -1  -1  -1  -1  -1  -1   1   1   1  -1   1  -1
       1   1   1   1  -1   1   1  -1   1  -1   1  -1  -1  -1  -1  -1}

CHANNEL ESTIMATION FOR OFDM COMMUNICATION SYSTEMS INCLUDING IEEE 802.11A AND EXTENDED RATE SYSTEMS

CROSS-REFERENCES TO RELATED APPLICATIONS

This application claims the benefit of U.S. Provisional Application No. 60/462,286, filed Apr. 10, 2003, entitled "Channel Estimation for IEEE 802.11a and Extended Rates," which disclosure is incorporated herein by reference for all purposes.

The present disclosure is related to commonly-assigned co-pending U.S. patent application Ser. No. 10/820,440, filed Apr. 5, 2004, entitled "Modified Preamble Structure for IEEE 802.11a Extensions to Allow for Coexistence and Interoperability Between 802.11a Devices and Higher Data Rate, MIMO or Otherwise Extended Devices," which disclosure is incorporated herein by reference for all purposes.

BACKGROUND OF THE INVENTION

The present invention relates generally to channel estimation in communication systems and in particular to channel estimation techniques for wireless communication systems using multiple subcarriers, including systems compliant with the IEEE 802.11a standard.

In a typical wireless communication system in use today, a transmitter and a receiver communicate in accordance with a protocol such as the IEEE 802.11a standard. The standard specifies a keying scheme that generally involves grouping. Bits of data to be transmitted are grouped and each group of bits is mapped to a symbol (a particular combination of phase and amplitude) in a signaling constellation. A number of constellations (or keying schemes) are known in the art, including binary phase-shift keying (BPSK), quadrature phase-shift keying (QPSK), and quadrature amplitude modulation (QAM) constellations. The transmitter includes an encoder that transforms an input data stream into a sequence of symbols. The transmitter may also insert additional information-carrying symbols into the input data stream. For example, protocols such as IEEE 802.11a specify a "preamble" to precede transmitted data. The preamble usually includes parameter values related to various features of the signal (e.g., data rate, keying scheme, etc.) as well as a known sequence of bits or symbols (referred to herein as a "training sequence") that the receiver can use for calibration. The symbols are modulated using an appropriate protocol (e.g., OFDM (orthogonal frequency division multiplexing) in the case of IEEE 802.11a) into a form suitable for transmission over a channel. The receiver receives the signal, demodulates it, and generates an output data stream that ideally is identical to the input data stream.

In practice, the output data stream has a non-zero bit error rate that depends on various factors. For example, channel properties such as fading and delay, as well as noise, are known to affect the received signal. Receivers in use today generally include circuitry for estimating and compensating for channel and noise effects.

In typical communication protocols, channel effects are generally estimated by measuring the receiver's response to a known sequence of input symbols that is inserted into the input data stream. For instance, FIG. 1 illustrates a transmission in a system complying with the IEEE 802.11a standard. Each transmission begins with a 20 microsecond (µs) preamble having short training symbols S, a guard interval LG, long training symbols L, and a signal field (4 microseconds). The preamble is followed by data. The first eight microseconds of the preamble comprise ten identical short training symbols S (0.8 µs each) that are used for packet detection, automatic gain control and coarse frequency estimation. The second eight microseconds comprise two identical long training symbols L (3.2 µs each), preceded by a guard interval LG that is the same pattern as the last half (1.6 microseconds) of the long training symbol L. The long training symbols can be used for channel estimation, timing, and fine frequency estimation. The signal field provides information about the data, such as the length of the packet, encoding scheme (or data rate), and the like.

FIG. 2 shows a long training sequence $L_1$ that is used to generate the signal representing the long training symbol in a conventional 802.11a preamble. This sequence represents values (phase shifts) used for each of the 64 subcarriers. As specified in the standard, the subcarriers span a 20 MHz channel and are spaced apart by 312.5 kHz. By convention, used here, the first value in the sequence $L_1$ is the value for the DC subcarrier (index k=0), followed by the value for the 1×312.5 kHz subcarrier, then the value for the 2×312.5=625 kHz subcarrier, etc., up to the 32nd value for the 31×312.5 kHz=9687.5 kHz subcarrier. The 33rd value corresponds to the −10 MHz subcarrier, followed by the −(10 MHz-312.5 kHz) subcarrier, and so on, with the 64th (index k=63) value corresponding to the −312.5 kHz subcarrier. As can be seen from FIG. 2, the DC value and the 28th through 38th values (corresponding to subcarriers near the edges of the 20 MHz channel that are not used to transmit data) are zero.

The output of the transmitter is a long training symbol at a sample rate of 64 samples/symbol. The samples are obtained by taking a 64-point IFFT (inverse Fast Fourier transform) of the long training sequence $L_1$. As used herein, a sequence in the frequency domain is expressed with uppercase letters (e.g., L[k]), while the corresponding time sequence is expressed with lowercase letters (e.g., l[i]). The transformed samples l[i] are modulated according to the RF channel frequency, converted to analog, and transmitted.

The receiver detects the RF signal, converts it to digital (at standard 20 MHz sampling rate) and demodulates it. Thus, the receiver generates 64 samples during each repetition of the long training symbol, for a total of 128 training samples. These training samples r[i] (where i=0, 1, ..., 127) are used to compute channel response according to various conventional algorithms. For example, one such algorithm involves averaging the corresponding samples from the two repetitions of the long training symbol:

$$\bar{r}[i]=(r[i]+r[i+64])/2,\ i=0, 1, \ldots, 63. \quad \text{(Eq. 1)}$$

A Fast Fourier Transform (FFT) is performed on the averaged time-domain samples $\bar{r}[i]$ to obtain 64 subcarrier components S[k], k=0, 1, ..., 63, representing the channel amplitude and phase for each subcarrier, phase shifted according to the components of the training sequence $L_1$. The phase shift due to the training sequence is removed by multiplying each subcarrier coefficient S[k] by the corresponding training sequence element $L_1$[k], and an IFFT is performed on the result to obtain a complex-valued channel impulse response $\hat{h}$[i] for each subcarrier.

Recently, there has been interest in developing multiple input, multiple output (MIMO) wireless systems to provide increased data rates. Such systems generally include a transmitter system having a number ($M_t$) of transmit antennas (transmitters) communicating with a receiver system having a number ($M_r$) of receive antennas (receivers), where $M_r$ and $M_t$ may or may not be equal. In a MIMO communication system, each of the $M_t$ transmit antennas transmits, at substantially the same time, a symbol representing a different group of bits from the input data stream. If each symbol represents B bits, the number of bits transmitted per symbol period is $B*M_t$. Thus, MIMO systems are considered desirable as a way to increase bandwidth of the communication system. For example, a conventional SISO system compliant with IEEE 802.11a can transmit up to 54 Mbps (megabits per second). In a MIMO system with $M_t$ transmit antennas, the data rate can be increased to $M_t*54$ Mbps.

MIMO systems introduce additional complexity to the channel estimation that the receiver needs to perform. Specifically, each receive antenna receives a signal that is a combination of signals from the transmit antennas, modified by the channel properties and noise. In effect, there is a channel from each transmitter to each receiver, and separate channel estimates must be made for each such channel. Thus, the per-carrier channel estimate h[i] becomes an $M_r \times M_t$ matrix $\tilde{h}[i]$.

Various techniques for modifying the IEEE 802.11a preamble for use in MIMO systems have been suggested. These techniques generally involve changing or repeating the preamble to allow separate calibration for each transmit antenna. Some of these techniques, such as having each transmit antenna transmit the training sequence while other antennas transmit nothing, can lengthen the training period and reduce the data rate.

It would be desirable to provide improved channel estimation techniques for use in MIMO-extended 802.11a and other wireless communication systems.

BRIEF SUMMARY OF THE INVENTION

Embodiments of the present invention provide channel estimation techniques that can be used in legacy 802.11a and extended systems. In some embodiments, channel impulse response is adaptively truncated in the time domain during channel estimation, based on channel power and noise considerations. In other embodiments, channel response tracking techniques are implemented to correct for variations in channel response over the transmission time of a packet.

According to one aspect of the present invention, a method is provided for determining channel estimates at a receiver for a wireless communication system using orthogonal frequency division multiplexing (OFDM) over a plurality of OFDM subcarriers. Training signals are received from one or more receive antennas. An estimated channel impulse response is computed from the received training signals by reference to a training sequence. The estimated channel impulse response is truncated in the time domain to improve the signal-to-noise ratio of the channel estimates. In some embodiments, adaptively truncating the estimated channel impulse response includes computing a cutoff time that maximizes a sum of channel power and signal-to-noise ratio; truncating the time domain channel impulse response estimate at the cutoff time; and transforming the truncated time domain channel impulse response estimate to a frequency domain channel impulse response estimate.

According to another aspect of the present invention, a method is provided for channel estimation for a receiver of a multiple input, multiple output (MIMO) communication system wherein signals are transmitted using orthogonal frequency division multiplexing (OFDM) over a plurality of OFDM subcarriers. At each of a plurality of receive antennas, signals are received from a plurality of transmit antennas, wherein the signal from each transmit antenna includes a different subset of the plurality of OFDM subcarriers. The received signals at each receive antenna are transformed to a plurality of impulse coefficients for that receive antenna, each impulse coefficient corresponding to a different one of the OFDM subcarriers. For each of the receive antennas, a channel impulse response is computed for one of the transmit antennas using the impulse coefficients for the subset of the OFDM subcarriers transmitted by the one of the transmit antennas. In some embodiments, computing a channel impulse response for one of the transmit antennas includes adaptively truncating a time domain channel impulse response estimate to improve the signal-to-noise ratio of the channel estimates.

According to yet another aspect of the present invention, a method is provided for tracking channel variations during receipt of a packet using one or more receive antennas. An initial channel estimate is determined from training data included in the packet. A received symbol in the packet is identified. An input symbol value is estimated using the received symbol value and the initial channel estimate. A per-symbol channel estimate is derived from the received symbol value and the estimated input symbol value. The initial channel estimate is updated using the per-symbol channel estimate.

The following detailed description together with the accompanying drawings will provide a better understanding of the nature and advantages of the present invention.

BRIEF DESCRIPTION OF THE DRAWINGS

FIG. 1 illustrates the structure of a conventional IEEE 802.11a packet.

FIG. 2 shows a long training sequence L1 used to generate a portion of a conventional IEEE 802.11a preamble.

DETAILED DESCRIPTION OF THE INVENTION

Embodiments of the present invention provide improved channel estimation techniques that can be implemented in conventional ("legacy") IEEE 802.11a communication systems as well as in various extended rate 802.11a-based systems and other wireless communication systems using OFDM.

System Overview

Figure 3:
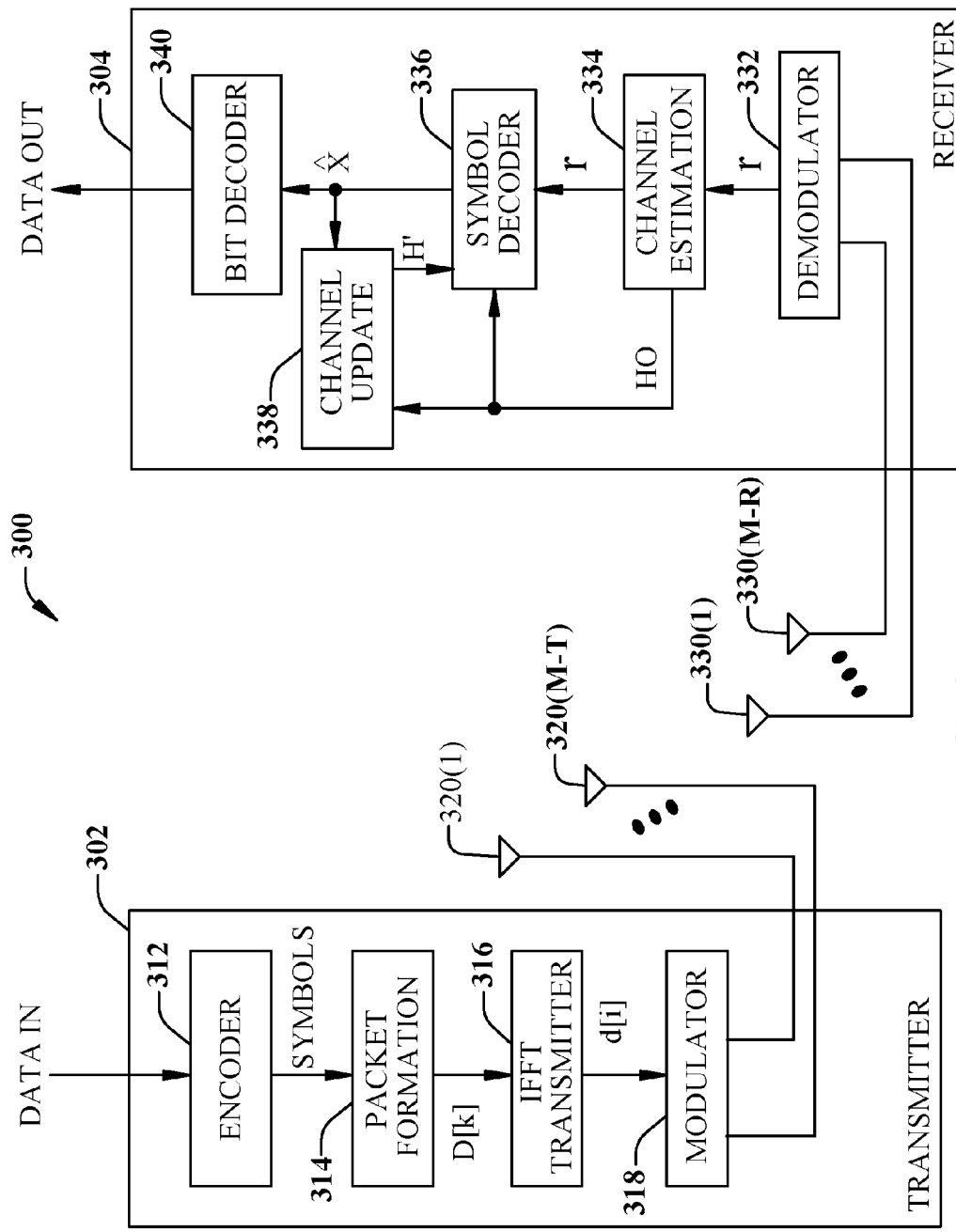
FIG. 3 is a simplified block diagram of a wireless communication system according to an embodiment of the present invention, including a transmitter and a receiver.

FIG. 3 is a simplified block diagram of a MIMO communication system 300 suitable for implementing channel estimation according to an embodiment of the present invention. MIMO communication system 300 includes a transmitter system 302 and a receiver system 304 communicating via a channel 306. Transmitter system 302 includes an encoding block 312 that receives an input data stream and encodes it into a sequence of symbols (complex values) to be transmitted, a packet formation block 312 that formats the encoded data into packets for transmission, an IFFT (inverse Fast Fourier Transform) block 316 that applies the symbol data as modulation to a number of subcarriers, and a modulator block 318 that modulates the IFFT output according to a carrier frequency for transmission via a number ($M_t$) of transmit antennas 320. Herein, multiple instances of like objects are denoted with reference numbers identifying the object and parenthetical numbers identifying the instance where needed.

Receiver system 304 includes a demodulator 332 for demodulating a signal received via a number ($M_r$) of receive antennas 330, a channel estimation block 334 that determines channel effects from the training data, a decoder 336, and a channel update block 338.

Communication system 300 is advantageously implemented as an OFDM (orthogonal frequency division multiplexing) system, in which signals are split into several narrowband channels at different subcarrier frequencies selected to minimize interference between the channels. In some embodiments, communication system 300 is operable in various modes, one of which is compliant with the IEEE 802.11a standard entitled "Part 11: Wireless LAN Medium Access Control (MAC) and Physical Layer (PHY) specifications, High-speed Physical Layer in the 5 GHz Band" incorporated herein by reference. In other modes, system 300 may be compliant with various extensions of the IEEE 802.11a standard, such as extensions described in above-referenced application Ser. No. 10/820,440.

As shown in FIG. 3, input data is provided (generally as a bit stream) to encoder 312, which encodes the data stream into a sequence of complex numbers (symbols). In some embodiments, encoding may include forward error correction (FEC) encoding (which involves introducing redundant bits into the data stream), bit interleaving, and mapping groups of bits to symbols in a signaling constellation (using, e.g., any of BPSK (binary phase shift keying), QPSK (quadrature phase-shift keying), 16QAM (quadrature amplitude modulation), or 64QAM). Numerous encoding and mapping techniques are known in the art and may be implemented in encoder 312. In some embodiments, encoder 312 may also be controllable via various parameters to select, e.g., different error correction schemes or different signaling constellations. A detailed description of encoding techniques is omitted as not being critical to understanding the present invention.

After mapping, the symbols are provided to packet formation block 314, which groups the symbols into packets for transmission. Packet formation block 314 may also add additional symbols into the data stream, such as a conventional IEEE 802.11a preamble as illustrated in FIG. 1 or a modified IEEE 802.11a preamble, e.g., as described in above-referenced application Ser. No. 10/820,440.

Packet formation block 314 provides groups of symbols to IFFT module 316, which uses the group of symbols to modulate a group of OFDM subcarriers. In general, if a group of symbols D[k], k=0, 1, . . . , 63 is provided, IFFT module 316 generates 64 time-domain samples d[i]:

$$d[i] = \sum_{k=0}^{63} D[k]\exp\left(j\frac{2\pi ik}{64}\right), \quad \text{(Eq. 2)}$$

where $j=\sqrt{-1}$.

In an IEEE 802.11a-compliant embodiment of systems 300, the DC subcarrier and 11 subcarriers near the edges of the 20 MHz channel are not used for data transmission. In addition, four of the remaining 52 subcarriers are used to transmit pilot tones. As is known in the art, packet formation block 314 may insert appropriate complex values at unused or pilot subcarrier locations in each group of symbols D[k] to comply with these aspects of the standard. In other embodiments, any or all of the subcarriers k may be used to transmit data, thereby increasing the data rate. In still other embodiments, even and odd subcarriers (or other groupings of subcarriers) may be transformed separately for transmission via different transmit antennas 320.

Modulator 318 uses the sample values provided by IFFT block 316 to modulate an RF carrier wave and delivers the resulting signal to the $M_t$ transmit antennas (transmitters) 320 for transmission. In some embodiments, each transmit antenna 320 transmits different data in parallel, possibly with a cyclic shift in the data from different antennas. In other embodiments, each antenna transmits a full set of subcarriers in a different RF channel band.

At receiver system 304, the transmitted signal is received, and the reverse of the transmitter process occurs to reconstruct the input data stream. Thus, demodulator 332 receives the signals via $M_r$ receive antennas 330 (receivers), removes the RF modulation, and provides a sequence of samples to the remaining components. In one embodiment, groups of samples are provided as an $M_r$-component vector r[i] (with complex components) representing the signal sample from each receive antenna 330 at a given time. Each component of r[i] is a linear combination of signals from all of the $M_t$ transmitters, with each signal being affected by (generally different) channel properties.

Channel estimation block 334 is configured to detect a sample stream r[i] corresponding to the long training sequence and to use the detected training samples to generate channel estimates. Recognition of the training sequence may be accomplished using a variety of techniques, including mode-sensing techniques described in above-referenced application Ser. No. 10/820,440. The channel estimates are advantageously provided as a set of $M_r M_t$ matrices H[k] with complex valued components that represent the channel effect for a particular transmit-receive pair for a given subcarrier k. Channel estimation block 334 advantageously implements an improved algorithm for generating channel-estimate matrices H[k], such as any of the algorithms described below. In some embodiments, channel estimation block 334 may also include additional components adapted to estimate other error corrections from the training data, e.g., clock and carrier frequency offsets, noise power, and the like. Such aspects of error correction are not critical to the present invention and a detailed description is omitted.

Symbol decoder block 336 applies the channel estimates H (as well as any other corrections) to the samples r[i] and generates a reconstructed symbol stream x̂ that ideally corresponds to the sequence of symbols provided to IFFT block 316. This symbol stream is provided to bit stream block 340, which reverses the keying, interleaving, and encoding processes of encoder block 312 to generate an output bit stream. Symbol decoder block 336 and bit stream block 340 may be implemented using a variety of techniques, and a detailed description is omitted as not being critical to understanding the present invention.

In some embodiments, the channel estimates $\mathbb{H}$, the decoded symbols $\hat{x}$, and the received samples r are provided to a channel update module 338. Channel update module 338 uses the received samples r and the decoded symbols $\hat{x}$ to detect changes in the channel properties that may occur during transmission of a packet. Channel properties may be affected by various environmental changes, such as motion of a mobile transmitter system 302 and/or receiver system 304, operation of other devices in the area, and so on. Channel estimation block 334 can be expected to update the channel estimates to reflect such changes when the next training sequence is received, but in this embodiment, channel estimation block 334 does not detect changes that may occur while the data portion of a packet is being transmitted. Thus, channel update module 338 advantageously employs adaptive feedback mechanisms (described further below) to compensate for motion or other environmental changes.

It is to be understood that the MIMO communication system described herein is illustrative and that variations and modifications are possible. Any number of transmit antennas $M_t$ and any number of receive antennas $M_r$ may be provided, and it is not required that $M_t$ and $M_r$ be equal. In addition, some or all components may be replaced with components having a single transmit antenna and/or a single receive antenna. The design of various system components, as well as methods used for forward error correction, interleaving, and modulation can be varied. The components described herein may be implemented using hardware, software, or any combination of hardware and/or software elements.

Preamble Generation

As described above, packet formation block 314 advantageously prepends a preamble to each transmitted packet. In one embodiment, a conventional IEEE 802.11a preamble may be used. In other embodiments, a preamble suitable for extended-rate 802.11a communication systems may be used. For example, in a MIMO implementation with two transmit antennas (transmitters), each transmitter may transmit a conventional 802.11a preamble while the other transmits nothing. Another option is for each transmitter to transmit a subset of the subcarriers (e.g., in a two-transmitter system, one transmitter might transmit even subcarriers while the other transmits odd subcarriers).

Another option, described in above-referenced application Ser. No. 10/820,440, is to apply a cyclic delay shift on the long training symbol and Signal field IFFT outputs prior to applying the guard time extension. For example, assume L[k] and D[k] are the 64 subcarrier values for the long training symbol and Signal field symbol, respectively. For a conventional 802.11a single transmitter transmission, the time samples for the long training symbol are derived by taking the 64-point IFFT of L[k] to obtain l[i] and transmitting the samples of l[i]. Thus, with the guard time, the long training symbol and guard time are constructed as {l[33:64] l[1:64] l[1:64]}, i.e., the IFFT output is repeated twice and the last 32 samples are prepended to form the long training guard interval. As with the conventional timing, the long training guard interval (32 samples) is twice as long as the guard interval for 802.11a data symbols (16 samples). The signal field is formed by {d[49:64] d[1:64]}, where d[1:64] are the 64 samples of the IFFT of D[k].

In the case of a two transmitter MIMO device, the first transmitter would transmit the long training symbol and signal field as in conventional 802.11a. The second transmitter would apply a cyclic shift such that instead of the IFFT output l[1:64], it uses the cyclically shifted samples ls={l[33:64] l[1:32]} to construct the long training symbol samples as {ls[33:64] ls[1:64] ls[1:64]}. For the signal field, the second transmitter uses the shifted samples ds={d[33:64] d[1:32]} to construct the signal field as {ds[49:64] ds[1:64]}.

In a legacy 802.11a packet, one 3.2 microsecond repetition of the long training symbol L is expressed in the time domain as the IFFT of $L_1[k]$, where $L_1[k]$ contains 64 subcarrier values, of which 52 are non-zero (as shown in FIG. 2). The time samples l[i] are given as:

$$l[i] = \sum_{k=0}^{63} L[k]\exp\left(j\frac{2\pi i k}{64}\right). \quad \text{(Eq. 3)}$$

In an extended mode long training sequence, $L_1[k]$ may be modified. For example, a modified L[k] can contain more than 52 non-zero subcarriers. Examples of suitable long training sequences with additional non-zero subcarriers are shown as sequences $L_2$ and $L_3$ in FIG. 4, following the same convention for subcarrier order as standard training sequence $L_1$ of FIG. 2. $L_2$ is advantageously used in communication systems configured for single input, multiple output (SIMO), while $L_3$ is advantageously used in MIMO communication systems. Other long training sequences may also be used, including various sequences having one or more of the following features: (1) the sequence is formulated such that channel estimation can be done for multiple transmitters; (2) the sequence has low cross-correlation with the standard 802.11a training sequence; and (3) the sequence is usable in a process for determining whether the packet is an 802.11a packet or an extended-mode packet. Further discussion of selection of training sequences may be found in above cross-referenced application Ser. No. 10/820,440.

Second, in the case of MIMO transmission, l[i] can have a cyclic shift that may be different for each transmitter m. The shifted signal $l_m[i]$ can be derived from l[i] as $l_m[i]=l[(i+64-\delta_m)\%64]$, where "%" denotes the modulo operator and $\delta_m$ is the cyclic delay of transmitter m in 20 MHz samples. This expression assumes a 20 MHz sampling rate, such that there are 64 samples in a 3.2 microsecond interval. An alternative method of generating the cyclic shift is to apply a phase ramp rotation to all subcarrier values of L(k) prior to calculating the IFFT, e.g.:

$$l_m(i) = \sum_{k=0}^{63} L(k)\exp\left(-j\frac{2\pi k \delta_m}{64}\right)\exp\left(j\frac{2\pi i k}{64}\right). \quad \text{(Eq. 4)}$$

A MIMO transmitter system can have two or more transmit antennas (or antenna arrays, as the case may be). For a MIMO system with two transmit antennas and two different transmit data streams, preferred values for the cyclic delay values $\delta_m$ are 0 and 32 samples, respectively. This corresponds to a cyclic delay of 1.6 microseconds between the two transmitters. For three transmitters, $\delta_m$ can be 0, 22, and 43 samples, respectively. For four transmitters, $\delta_m$ can be 0, 16, 32, and 48 samples, respectively.

Overview of Channel Estimation in a MIMO System

Figures 4, 5:
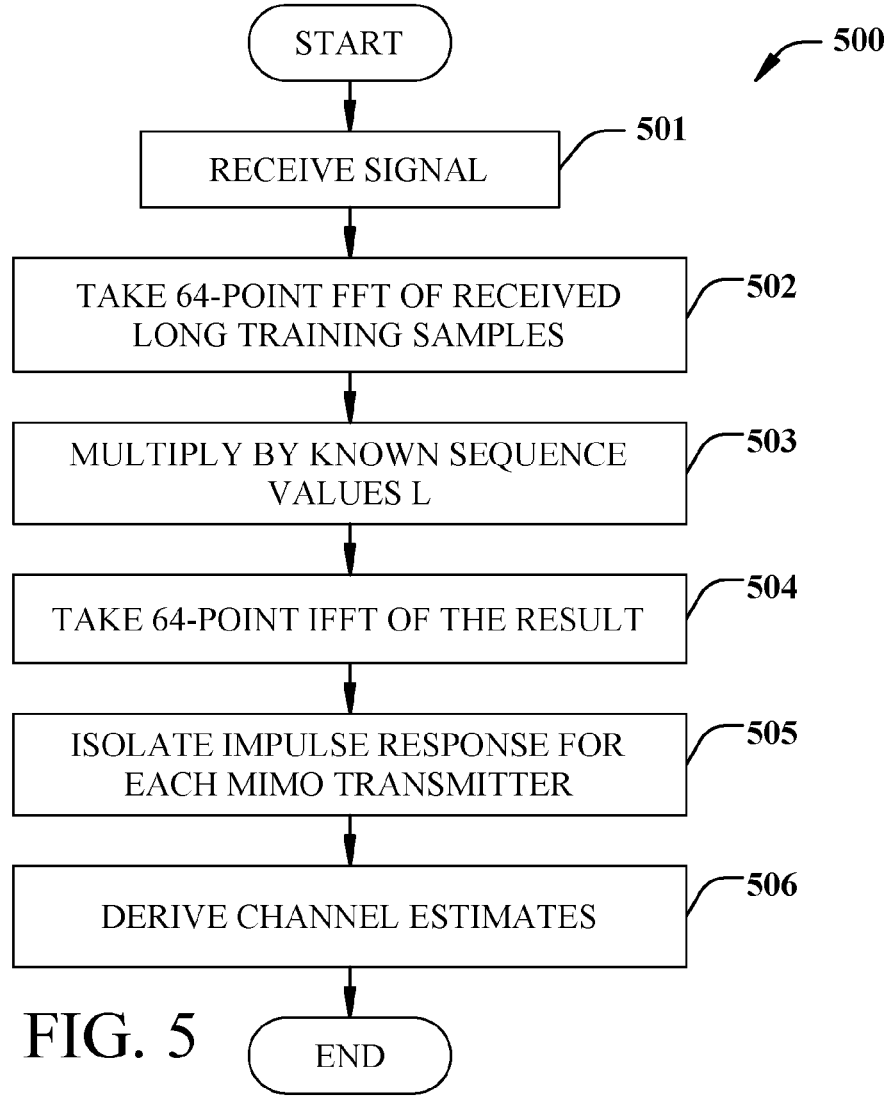
FIG. 4 shows alternative long training sequences suitable for use in an embodiment of the present invention.
FIG. 5 is a flow diagram of a process for obtaining channel estimates for each transmitter signal in a MIMO system according to an embodiment of the present invention.

At the receiver side, the channel estimates for each transmitter signal can be estimated by a process such as process 500 shown in FIG. 5. Process 500 begins with receiving and (digitally) sampling signals for the long training symbol (step 501). Then, a 64-point FFT (Fast Fourier Transform) of the received long training symbol samples is taken (step 502), as is done for conventional 802.11a preamble reception. Next, each subcarrier is multiplied by known phase shift (L) values (step 503), and an IFFT of the result is taken to get a 64-point impulse response estimate (step 504).

In one embodiment of a MIMO transmission, these 64 samples contain the cyclic shifted impulse responses for all $M_t$ transmitters. With that, the receiver can isolate the impulse responses for each MIMO transmitter (step 505). For MIMO with two transmit streams, this can be done by separating the first 32 samples and last 32 samples. For four transmit streams, groups of 16 samples can be extracted.

From the extracted impulse responses per transmitter, channel estimates can be derived (step 506) for all subcarriers by taking a 64-point FFT of each impulse response, where zero values are appended to the sample values to provide 64 input values. Where the receiver system has multiple receive antennas (or antenna arrays), process 500 may be performed for each receive antenna, resulting in a complete matrix of channel estimates.

Channel Estimation in a SIMO System

Some extended rate systems are single input, multiple output (SIMO) systems, in which one transmit antenna sends data to a number of receive antennas. Channel estimates are generated for each receive antenna. In some embodiments, channel impulse response time is generally shorter than the symbol period. For example, in IEEE 802.11a systems, the symbol period is 4 μs, while the channel impulse response time might be much shorter. Channel estimation block 334 can make use of this fact to adaptively truncate the impulse response, thereby improving the signal-to-noise ratio of the channel estimates.

Figure 6:
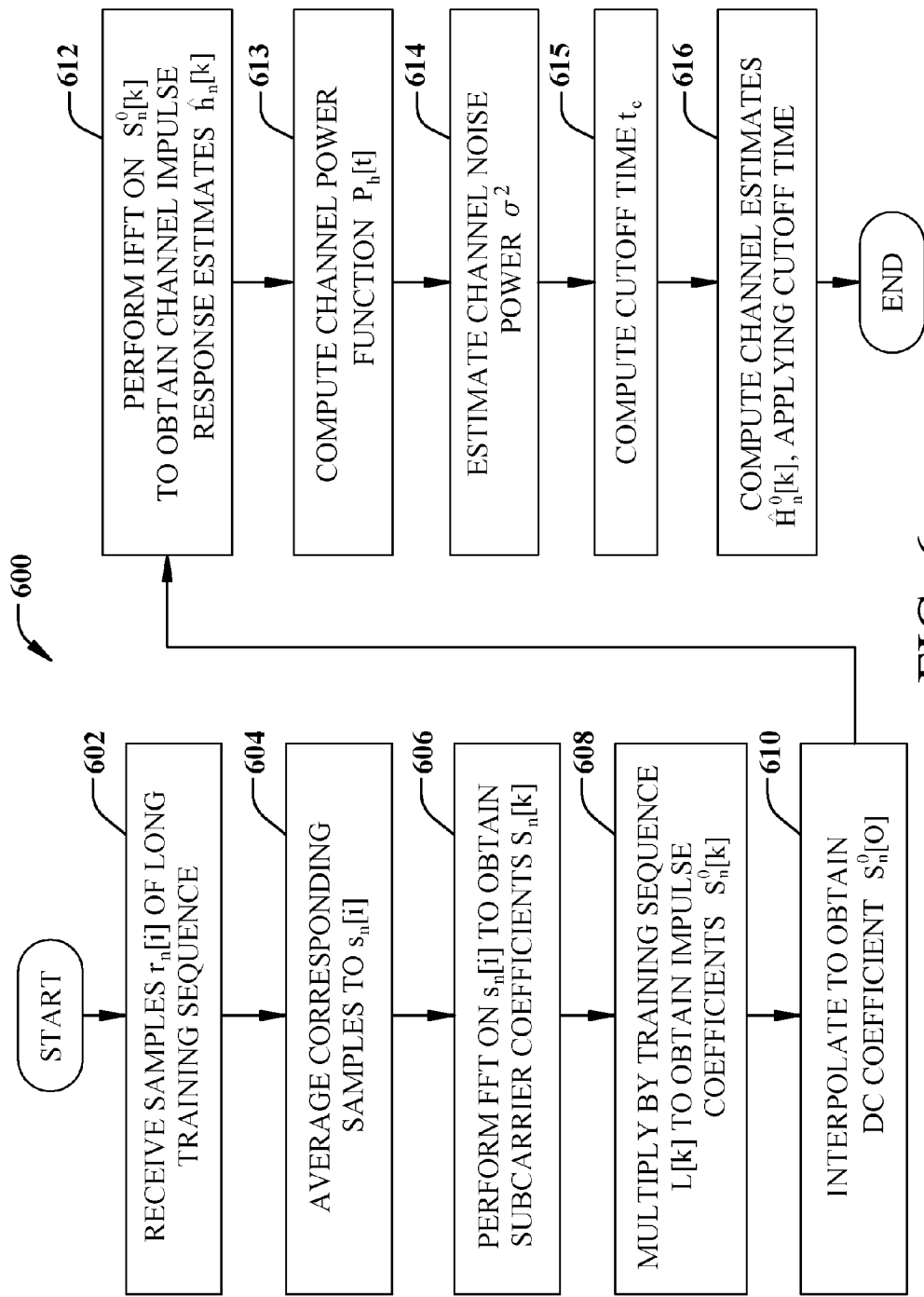
FIG. 6 is a flow diagram of a process for obtaining channel estimates with adaptive truncation for a SIMO system according to an embodiment of the present invention.

FIG. 6 is a flow diagram of a process 600 for generating channel estimates using adaptive truncation in a SIMO system in which one transmit antenna sends a data signal that is received by a number $M_r$ of receive antennas.

At step 602, samples for the long training symbol are received. In an 802.11a-compliant system, samples are received at 20 MHz, and each sample is provided as a complex number representing amplitude and phase. Since the symbol is transmitted twice, with a duration of 3.2 μs each time, 128 samples $r_n[i]$ are received for each receive antenna n (n=0, ..., $M_r$−1).

At step 604, corresponding samples from the first and second transmission of the long training symbol are averaged:

$$s_n[i] = \frac{r_n[i+\tau] + r_n[i+\tau+64]}{2}, i = 0, \ldots, 63. \quad \text{(Eq. 5)}$$

Here, τ is an estimated starting sample for the channel estimation, which may be, e.g., about 16 to 32 samples after the start of the long training symbol.

At step 606, a 64-point FFT of s[i] is computed to provide 64 subcarrier coefficients $S_n[k]$, k=0, 1, ..., 63:

$$S_n[k] = \sum_{i=0}^{63} s_n[i] \exp\left(-j\frac{2\pi ik}{64}\right). \quad \text{(Eq. 6)}$$

At step 608, the subcarrier coefficients S[k] are multiplied by the respective long training sequence values L[k] (for the long training sequence in use for a given embodiment, e.g., conventional sequence $L_1$ of FIG. 2 or extended sequence $L_2$ of FIG. 4) to determine impulse coefficients $S_n^0[k]$:

$$S_n^0[k] = L[k]S_n[k], k=0, \ldots, 63. \quad \text{(Eq. 7)}$$

Because L[0] is zero, the impulse coefficient at DC is "missing." At step 610, an impulse coefficient at DC is interpolated from the other impulse coefficients:

$$S_n^0[0] = \sum_{i=1}^{63} S_n^0[i] \exp\left(-j\frac{(i-32)\pi}{32}\right). \quad \text{(Eq. 8)}$$

At step 612, a 64-point IFFT is computed for the spectral coefficients $S_n^0[k]$, resulting in a channel impulse response estimate:

$$\hat{h}_n[i] = \sum_{k=0}^{63} S_n^0[k] \exp\left(j\frac{2\pi ik}{64}\right). \quad \text{(Eq. 9)}$$

To increase the signal-to-noise ratio (SNR) of the channel estimates, the impulse response of Eq. 9 is advantageously cut off (truncated) in time at a point that optimizes a tradeoff between channel power and noise. More specifically, in this embodiment, at step 613, a channel power function P[t] is defined for a time index t=0, ..., 63 as:

$$P_h[t] = \sum_{i=0}^{7} \sum_{n=0}^{M_r-1} |\hat{h}_n[(i+t) \bmod 64]|^2, \quad \text{(Eq. 10)}$$

where mod is the modulo operator. This function approximates the channel power received during a relatively short time interval beginning at time t (measured in samples). In other embodiments, the sum over 8 samples may be replaced with a sum over a different number of samples, and the modulo operator may be replaced with a cutoff at i+t=64.

At step 614, a channel noise power estimate $\sigma^2$ that represents the amount of noise included in the channel power loss function $P_h[t]$ is generated. A variety of techniques can be used to generate this estimate; in one embodiment, $$\sigma^2 = \min_{\tau} P_h[t]. \quad \text{(Eq. 11)}$$

Eq. 11 is a reliable noise estimate to the extent that $P_h[t]$ reflects a channel impulse response superimposed on a substantially constant background of noise, and to the extent that at some time index t, the channel response is dominated by the noise. It will be appreciated that other estimates of channel noise may also be used.

At step 615, a cutoff time $t_c$ is computed as:

$$t_c = \arg\min_k(P_h[t] + t\sigma^2), t = t_0, \ldots, 63, \quad \text{(Eq. 12)}$$

where $P_h[t]$ is given by Eq. 10, $\sigma^2$ is the channel noise power estimate from step 614, and "arg min" indicates that $t_c$ is the value of t for which the sum is minimized. A minimum cutoff time $t_0$ is advantageously predefined based on a minimum impulse response length determined by all filters at both transmit and receive ends of the channel. In one embodiment, $t_0=12$. More generally, a variety of methods for determining a minimum impulse response length are known in the art and may be used to define $t_0$.

It should be noted that Eq. 12 represents a tradeoff between keeping more or fewer of the time samples for the channel impulse response. As fewer samples are kept, the noise is reduced but more of the useful channel response information is lost. Other algorithms for evaluating this tradeoff to select a cutoff time may be substituted for that described herein.

At step 616, the 64-point FFT of the truncated impulse responses is computed as:

$$\hat{H}_n^0[k] = \sum_{i=0}^{63} \hat{h}_n^C[i]\exp\left(-j\frac{2\pi ik}{64}\right), \quad \text{(Eq. 13)}$$

where:

$$\hat{h}_n^C[i] = \begin{cases} \hat{h}_n[i], & i \leq t_c \\ 0, & i > t_c \end{cases} \quad \text{(Eq. 14)}$$

is the truncated channel impulse response estimate.

The FFT outputs of Eq. 13 are channel estimates $\hat{H}_0[k]$ that may be used for channel correction of received data signals. Various channel correction techniques are known in the art and may be employed in conjunction with channel estimation process 600.

Figure 7:
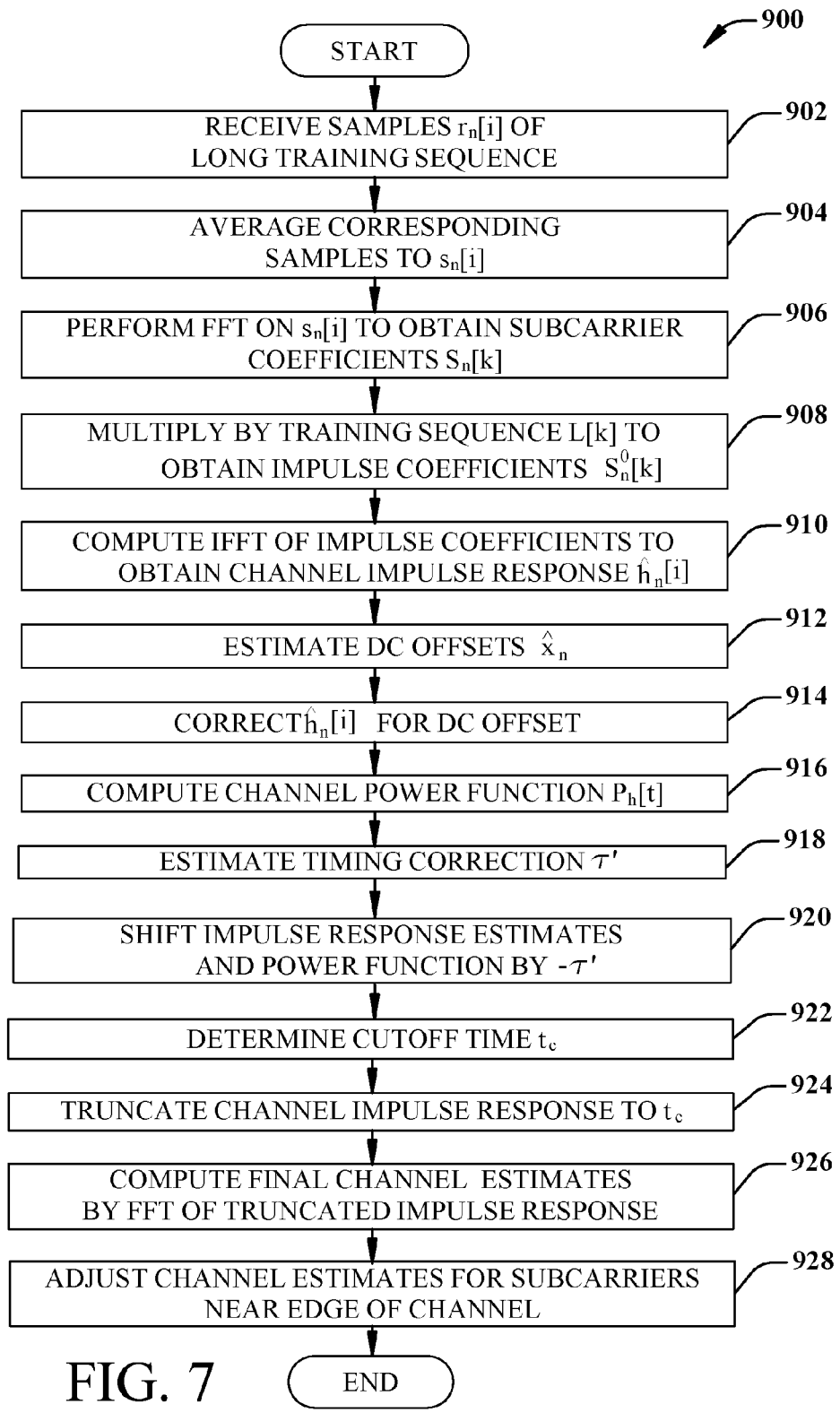
FIG. 7 is a flow diagram of an alternative process for obtaining channel estimates with adaptive truncation for a SIMO system according to an embodiment of the present invention.

FIG. 7 is a flow diagram of an alternative process 900 for channel estimation with adaptive truncation in a SIMO OFDM system. This process is generally similar to process 600 described above except that the DC offset estimation is done somewhat differently and the computation of the cutoff time is modified. In addition, process 900 introduces a timing refinement.

More specifically, steps 902, 904, 906, and 908 correspond to steps 602, 604, 606, and 608 of process 600 described above and result in impulse coefficients $S_n^0[k]$ in accordance with Eqs. 5-7 given above. At step 910, a 64-point IFFT of the impulse coefficients is computed to obtain channel impulse response estimates as:

$$\hat{h}_n[i] = \sum_{k=0}^{63} S_n^0[k]\exp\left(j\frac{2\pi ik}{64}\right). \quad \text{(Eq. 15)}$$

It should be noted that Eq. 15 differs from Eq. 9 above in that the DC coefficient $S_0^0[k]$ has not been interpolated to a non-zero value. Instead, in process 900, the DC offset is corrected in the time domain. Specifically, at step 912, the DC offset for each receiver is estimated by averaging the tail of the channel impulse response of that receiver over 16 samples:

$$\hat{x}_n = \frac{1}{16}\sum_{i=40}^{55} \hat{h}_n[i], \quad \text{(Eq. 16)}$$

where the sample window (40 to 55 in Eq. 16) may be optimized for a particular embodiment as desired. The sample window is advantageously chosen to be near the end of the sampling interval but may be shifted away from the end somewhat, e.g., to avoid effects of any timing inaccuracy in choosing the starting sample. In addition, the size of the sample window may be varied as desired.

At step 914, the channel impulse response estimates $\hat{h}_n[i]$ are corrected for the DC offset:

$$\hat{h}_n^0[i] = \hat{h}_n[i] - \hat{x}_n. \quad \text{(Eq. 17)}$$

Next, the timing estimate τ that was used to select the sample window (see Eq. 5) is refined based on the channel impulse response. At step 916, a channel power function is computed as:

$$P_h[t] = \sum_{i=0}^{7}\sum_{n=0}^{M_r-1} \left|\hat{h}_n^0[(i+t)\bmod 64]\right|^2, \quad \text{(Eq. 18)}$$

similarly to step 613 of process 600. At step 918, the timing correction τ' is estimated as:

$$\tau' = \arg\max_t P_h[t], \quad t = 0, \ldots, 63; \quad \text{(Eq. 19)}$$

that is, τ' is the value of t for which $P_h[t]$ is maximized. This timing correction is used to adjust the initial sample time from τ to τ'. Accordingly, at step 920, the impulse responses and the power estimate are cyclically shifted by −τ' samples:

$$\hat{h}_n^\tau[i] = \hat{h}_n^0[(i+\tau')\bmod 64], \quad \text{(Eq. 20)}$$

and $$P_h^\tau[i] = P_h[(i+\tau')\bmod 64]. \quad \text{(Eq. 21)}$$

Next, at step 922, a cutoff time $t_c$ for the impulse response is determined. The cutoff time can be determined according to Eq. 12 above. In an alternative embodiment, the noise power estimate is obtained as:

$$\sigma_n^2 = \min_i(P_h^\tau[i])/4, \quad \text{(Eq. 22)}$$

and the cutoff time $t_c$ is given by:

$$t_c = \min_i\{P_h^\tau(i) < 2\sigma_n^2\}, i = 8, \ldots, 31, \quad \text{(Eq. 23)}$$

that is, the smallest time index i for which $P_h^\tau[i]$ is less than twice the noise power estimate. The minimum cutoff time (8 in Eq. 23) is selected to prevent unrealistically small cutoff values from being used in channels with large noise or interference levels. As in process 600, this minimum time may be selected based on the known filtering properties of the transmit and/or receive antennas.

At step 924, the time-corrected channel impulse responses $\hat{h}_n^\tau(i)$ are truncated. In some embodiments (e.g., where the transmitter is a legacy transmitter or other type of transmitter that does not use all subcarriers), abrupt truncation in the time domain can give rise to Gibbs' phenomena in the frequency domain. To mitigate this effect, the truncation may be done using a windowing function w(i) defined as:

$$w(i) = \begin{cases} 1 & i < t_c - 4 \\ \frac{1}{2}(1+\cos(\pi(i-t_c-4)/8)) & t_c-4 \le i \le t_c+4 \\ 0 & t_c+4 < i < 58 \\ \frac{1}{2}(1+\cos(\pi(64-i)/8)) & 58 \le i \end{cases} \quad \text{(Eq. 24)}$$

The channel impulse response is then given by:

$$\hat{h}_n^F[i] = \hat{h}_n^\tau[i]w(i). \quad \text{(Eq. 25)}$$

It will be appreciated that other windowing functions may be substituted. For instance, in embodiments where all subcarriers are used, the windowing function w(i)=1 for all i may be used.

At step 926, final channel estimates (in the frequency domain) are computed as a 64-point FFT of the truncated channel impulse responses of Eq. 25:

$$\hat{H}_n^0[k] = \sum_{i=0}^{63} \hat{h}_n^F[i] \exp\left(-j\frac{2\pi ik}{64}\right). \quad \text{(Eq. 26)}$$

In some embodiments, at step 928, the channel estimates for subcarriers near the channel edges may be replaced by untruncated channel estimates. For example:

$$\hat{H}_n^0[k] = S_n^0[k]\exp\left(-j\frac{2\pi k t_c}{64}\right), \quad k=26,27,39,40 \quad \text{(Eq. 27)}$$

may be used.

It will be appreciated that the channel estimation processes described herein are illustrative and that variations and modifications are possible. Steps described as sequential may be executed in parallel, order of steps may be varied, and steps may be modified or combined. Process 600 or 900 may also be implemented in a conventional (legacy) 802.11a system including single receiver systems. In addition, various steps or equations of process 600 may be combined with or substituted for corresponding steps or equations of process 900, or vice versa. For example, the windowing function of Eq. 24 may be used to truncate channel estimates in a process generally conforming to process 600. These processes may also be extended to MIMO systems, e.g., where different transmit antennas transmit the training sequence at different times.

Any desired training sequence L[k] may be used, including $L_2$ or $L_3$ shown in FIG. 4. For example, process 600 or 900 may be implemented in a legacy 802.11a communication system, e.g., with a single transmitter and a single receiver using the standard training sequence $L_1[k]$ of FIG. 2; in this instance, the window function of Eq. 24 is advantageously applied. As another example, in an extended rate system where all subcarriers are used, training sequence $L_2[k]$ of FIG. 4 might be used, and the window function of Eq. 24 might not be applied. In some embodiments, where all subcarriers except at DC are used to transmit data, a modified training sequence such as $L_2[k]$ or $L_3[k]$ (FIG. 4) that includes nonzero elements for all subcarriers may be used. It should also be noted that a modified training sequence such as $L_2[k]$ or $L_3[k]$ may indicate to the receiver that the transmitter is using an extended rate transmission protocol, as described in above-referenced application Ser. No. 10/820,440.

Channel Estimates for MIMO OFDM Systems

For MIMO systems with multiple independent transmitters, a channel estimate is advantageously computed for each transmitter-receiver pair. For example, in an embodiment of system 300 (FIG. 3) with two transmit antennas 320 and two receive antennas 330, four channels are present: (1) from antenna 320(1) to antenna 330(1); (2) from antenna 320(2) to antenna 330(1); (3) from antenna 320(2) to antenna 330(1); and (4) from antenna 320(2) to antenna 330(2). Process 600 described above may be adapted to generate a channel estimate for each of these channels.

Figure 8:
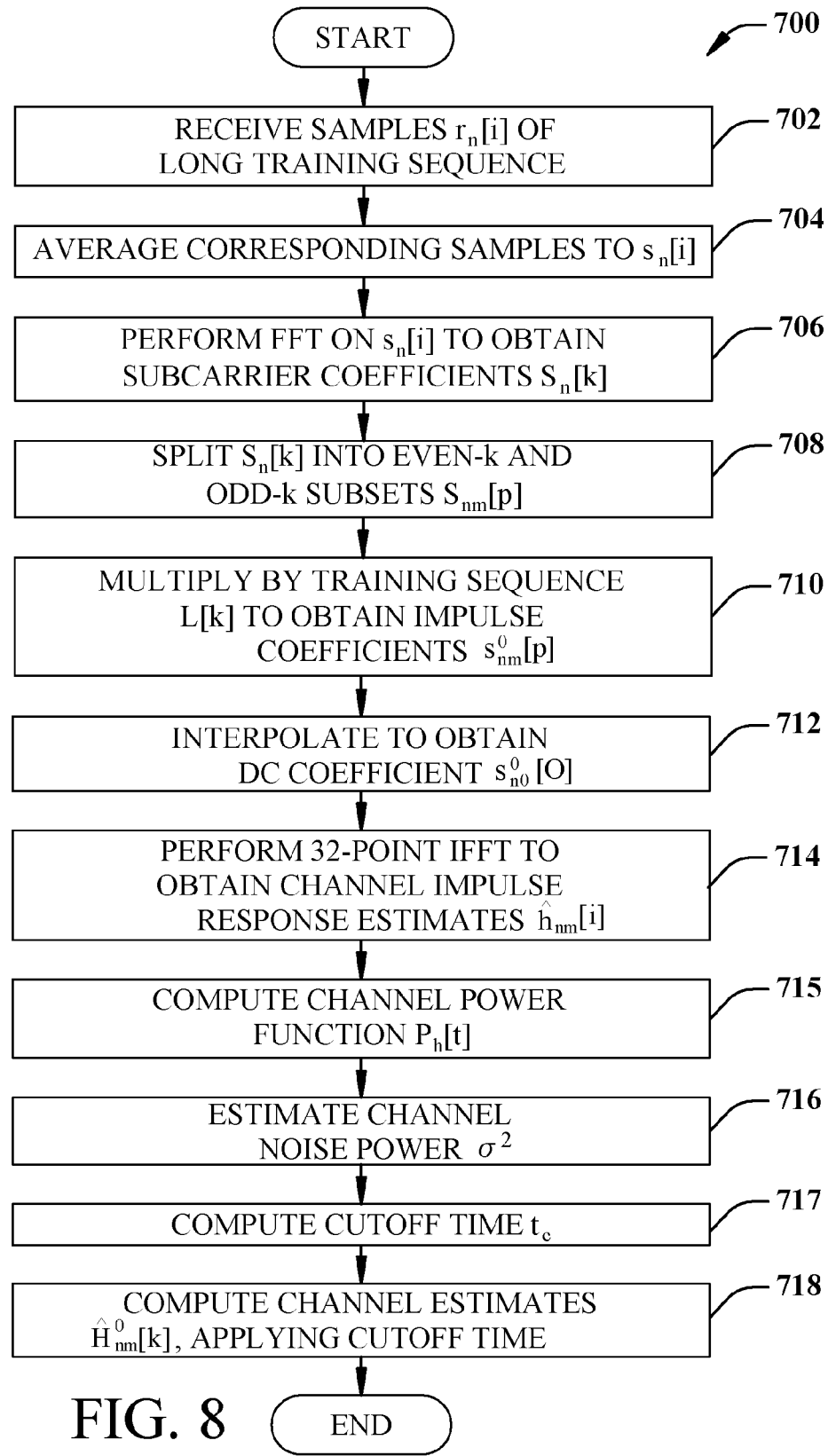
FIG. 8 is a flow diagram of a process for obtaining channel estimates with adaptive truncation in a MIMO OFDM system according to an embodiment of the present invention.

FIG. 8 is a flow diagram of a process 700 for computing channel estimates for each of a number of receive antennas in a MIMO system. In this example, there are two transmit antennas (m=0 and m=1), and each transmit antenna transmits only half the subcarriers for the training sequence. For example, transmit antenna m=0 may transmit the even subcarriers while transmit antenna m=1 transmits the odd subcarriers. Process 700 involves splitting the subcarrier coefficients $S_n[k]$ for each receive antenna n into two subsets $S_{nm}[k]$ and deriving a separate set of channel estimates for all subcarriers from each subset.

More specifically, at step 702 (which may be generally similar to step 602 of process 600 described above), samples for the long training symbol are received for each receive antenna. At step 704, for each receive antenna n, samples from the first and second half of the long training period are averaged, similarly to step 604:

$$s_n[i] = \frac{r_n[i+\tau]+r_n[i+\tau+64]}{2}, \quad i=0,\ldots,63. \quad \text{(Eq. 28)}$$

At step 706, a 64-point FFT of $s_n$ is computed for each receive antenna:

$$S_n[k] = \sum_{i=0}^{63} s_n[i]\exp\left(-j\frac{2\pi ik}{64}\right). \quad \text{(Eq. 29)}$$

At step 708, the 64 subcarrier coefficients $S_n[k]$ for each receive antenna n are split into two subsets $S_{nm}$ (where m=0, 1 denotes the transmit antenna), each including 32 coefficients In one embodiment, the even subcarriers (k=2p for integer p) are associated with transmit antenna 0 and odd subcarriers (k=2p+1 for integer p) are associated with transmit antenna 1.

At step 710, the subcarrier coefficients are multiplied with the known long training sequence values L[k] to determine impulse coefficients $S_{nm}^0[p]$:

$$\begin{cases} S_{n,0}^0[p] = L[2p]S_n[2p] \\ S_{n,1}^0[p] = L[2p+1]S_n[2p+1] \end{cases}, \quad \text{(Eq. 30)}$$

for p=0, 1, . . . , 31. In embodiments where L[0] is zero, $S_{n0}^0[0]$ becomes a "missing" impulse coefficient. At step 712, the missing impulse coefficient is supplied by interpolation, using:

$$S_{n0}^0[0] = \sum_{p=1}^{31} S_{n0}^0[p]\exp\left(-j\frac{(p-16)\pi}{16}\right). \quad \text{(Eq. 31)}$$

Thus, 32 impulse coefficients are available for each transmit-receive pair.

At step 714, a 32-point IFFT of each set of impulse coefficients $S_{nm}^0[p]$ is computed according to:

$$\hat{h}_{nm}[i] = \sum_{p=0}^{31} S_{nm}^0[p]\exp\left(j\frac{2\pi ip}{32}\right). \quad \text{(Eq. 32)}$$

This provides a channel impulse response estimate for each receiver-transmitter pair nm.

To increase the SNR of the channel estimates, the impulse responses are advantageously cut off (truncated) in time at a point that optimizes a tradeoff between channel power and noise. Specifically, at step 715, a channel power loss function $P_h[t]$ is defined for a time index t=0, . . . , 63 as:

$$P_h[t] = \sum_{i=0}^{7}\sum_{n=0}^{M_r-1}\sum_{m=0}^{M_t-1}\left|\hat{h}_{nm}^0[(i+t)\bmod 32]\right|^2, \quad \text{(Eq. 33)}$$

where $M_r$ is the number of receive antennas and $M_t$ is the number of transmit antennas. This function approximates the channel power received (from all transmitters) during a relatively short time interval beginning at time t (measured in samples). In other embodiments, the sum over 8 samples may be replaced with a sum over a different number of samples, and the modulo operator may be replaced with a cutoff at i+t=32.

At step 716, similarly to step 614, a channel noise power estimate $\sigma^2$ that represents the amount of noise included in the channel power function $P_h[t]$ is generated. A variety of techniques can be used to generate this estimate; in one embodiment, $$\sigma^2 = \min_t P_h[t]. \quad \text{(Eq. 34)}$$

Like Eq. 11 above, Eq. 34 is a reliable noise estimate to the extent that $P_h[t]$ reflects a channel impulse response superimposed on a substantially constant background of noise, and to the extent that at some time index t, the channel response is dominated by the noise. Other estimates of channel noise may also be used.

At step 717, a cutoff time $t_c$ is computed as:

$$t_c = \min_k(P_h[t] + t\sigma^2), \quad t = t_o, \ldots, 63 \quad \text{(Eq. 35)}$$

where $P_h[t]$ is given by Eq. 33 and $\sigma^2$ is the channel noise power estimate from step 716. As in process 600, a minimum cutoff time $t_0$ is advantageously predefined based on a minimum impulse response length determined by all filters at both transmit and receive ends of the channel. In one embodiment, $t_0$=12. More generally, a variety of methods for determining a minimum impulse response length are known in the art and may be used to define to.

At step 718, zeros are appended to the truncated channel impulse response to provide a total of 64 samples, and the (64-point) FFT is computed as:

$$\hat{H}_{nm}^0[k] = \sum_{i=0}^{t_c} \hat{h}_{nm}^C[i]\exp\left(-j\frac{2\pi ik}{64}\right), \quad \text{(Eq. 36)}$$

where $$\hat{h}_{nm}^C[i] = \begin{cases} \hat{h}_{nm}[i], & i \le t_c \\ 0, & t_c < i \le 63 \end{cases}. \quad \text{(Eq. 37)}$$

The FFT outputs of Eq. 36 are the channel estimates $\hat{H}_{nm}^0[k]$ for transmitter m, receiver n, and subcarrier k; these channel estimates may be used for channel correction of received data signals. Various channel correction techniques for MIMO systems are known in the art and may be employed in conjunction with channel estimation process 700.

It should be noted that process 700 results in channel estimates for all 64 subcarriers k for each receive-transmit pair nm. Thus, during transmission of the data portion of a packet, each transmit antennas may use all of the subcarriers, or any subset thereof, including overlapping subsets, and appropriate channel corrections may be applied.

Figure 9:
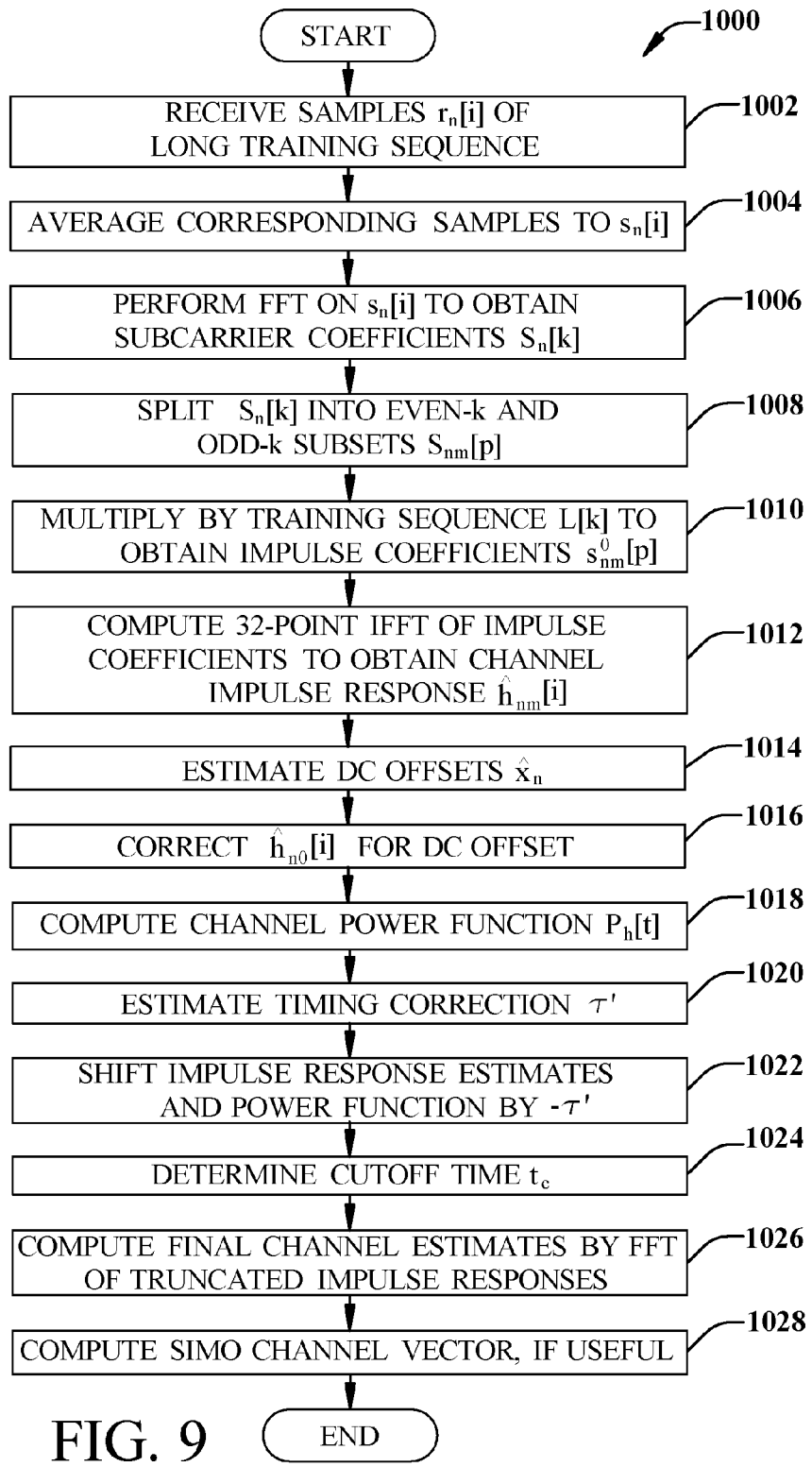
FIG. 9 is a flow diagram of an alternative process for obtaining channel estimates with adaptive truncation in a MIMO OFDM system according to an embodiment of the present invention.

FIG. 9 is a flow diagram of an alternative process 1000 for channel estimation in a MIMO extended rate system. This process is generally similar to process 700 described above except that the DC offset estimation is done somewhat differently and the computation of the cutoff time is modified. In addition, process 1000 introduces a timing refinement.

More specifically, steps 1002, 1004, 1006, 1008 and 1010 correspond to steps 702, 704, 706, 708 and 710 of process 700 described above and result in impulse coefficients $S_{nm}^0[k]$ in accordance with Eqs. 15-17 given above. At step 1012, a 32-point IFFT of the impulse coefficients for each transmit-receive pair is computed to obtain channel impulse response estimates as:

$$\hat{h}_{nm}[i] = \sum_{k=0}^{31} S_{nm}^0[k]\exp\left(j\frac{2\pi i(2k+m)}{64}\right). \quad \text{(Eq. 38)}$$

Alternatively, a 64-point IFFT may be used; in that case, $S_{nm}^0[k]$ is set to zero for odd subcarriers for transmit antenna m=0 and for even subcarriers for transmit antenna m=1.

It should be noted that Eq. 38 differs from Eq. 32 above in that the DC coefficient $S_{n0}^{0}[k]$ has not been interpolated to a nonzero value. Instead, in process 1000, the DC offset is corrected in the time domain. Specifically, at step 1014, the DC offset for each receiver is estimated by averaging the tail of the channel impulse response of that receiver over 4 samples:

$$\hat{x}_{n0} = \frac{1}{4} \sum_{i=25}^{28} \hat{h}_{n0}[i] \qquad \text{(Eq. 39)}$$

where the sample window (25 to 28 in Eq. 39) may be optimized for a particular embodiment as desired. The sample window is advantageously chosen to be near the end of the sampling interval but may be shifted away from the end somewhat, e.g., to avoid effects of any timing inaccuracy in choosing the starting sample. In addition, the size of the sample window may be varied as desired.

At step 1016, the channel impulse response estimates $\hat{h}_{n0}[i]$ are corrected for the DC offset:

$$\hat{h}_{n0}^{0}[i] = \hat{h}_{n0}[i] - \hat{x}_{n0} \qquad \text{(Eq. 40)}$$

It should be noted that DC offset correction is applied only for a transmit antenna whose spectral coefficients include a DC term, in this case transmit antenna m=0. Thus, in this example, $\hat{h}_{n1}^{0}[i] = \hat{h}_{n1}[i]$.

Next, the timing estimate $\tau$ that was used to select the sample window (see Eq. 28) is refined based on the channel impulse response. At step 1018, a channel power function is computed as:

$$P_h[t] = \sum_{i=0}^{7} \sum_{n=0}^{M_r-1} \sum_{m=0}^{M_t-1} \left| \hat{h}_{nm}^{0}[(i+t) \bmod 32] \right|^2, \qquad \text{(Eq. 41)}$$

similarly to Eq. 33 above. At step 1020, the timing correction $\tau'$ is estimated as:

$$\tau' = \arg\max_{t} P_h[t], \ t = 0, \ldots, 32, \qquad \text{(Eq. 42)}$$

similarly to Eq. 19 above. This timing correction is used to adjust the initial sample time from $\tau$ to $\tau'$. Accordingly, at step 1022, the impulse responses and the power estimate are cyclically shifted by $-\tau'$ samples:

$$\hat{h}_{nm}^{\tau}[i] = \hat{h}_{nm}^{0}[(i+\tau') \bmod 32], \qquad \text{(Eq. 43)}$$

and $$P_h^{\tau}[i] = P_h[(i+\tau') \bmod 32]. \qquad \text{(Eq. 44)}$$

Next, at step 1024, a cutoff time $t_c$ is determined. The cutoff time can be determined according to Eq. 34 above. In an alternative embodiment, the noise power estimate is obtained as:

$$\sigma^2 = \min_i (P_h^{\tau}[i])/4, \qquad \text{(Eq. 45)}$$

and the cutoff time $t_c$ is given by:

$$t_c = \min_i \{P_h^{\tau}(i) < 2\sigma^2\}, \ i = 8, \ldots, 31, \qquad \text{(Eq. 46)}$$

that is, the smallest time index i for which $P_h^{\tau}[i]$ is less than twice the noise power estimate. The minimum cutoff time (8 in Eq. 46) is selected to prevent unrealistically small cutoff values from being used in channels with large noise or interference levels. As in process 700, this minimum time may be selected based on the known filtering properties of the transmit and/or receive antennas.

At step 1026, the final channel estimates (in the frequency domain) are computed as a 64-point FFT of the truncated channel impulse responses, after appending 32 zeroes:

$$\hat{H}_{nm}^{0}[k] = \sum_{i=0}^{63} \hat{h}_{nm}^{F}[i] \exp\left(-j\frac{2\pi ik}{64}\right), \qquad \text{(Eq. 47)}$$

where $$\hat{h}_{nm}^{F}[i] = \begin{cases} \hat{h}_{nm}[i], & i \leq t_c \\ 0, & t_c < i \leq 63 \end{cases}. \qquad \text{(Eq. 48)}$$

In this embodiment, all subcarriers are used to transmit data (including training data of a sequence such as $L_3$ or $L_2$ of FIG. 4), and a windowing function is not needed for optimal results. In other embodiments, a windowing function (e.g., similar to Eq. 24 above) may be introduced if desired.

In some embodiments, the signal field of the packet (see, e.g., FIG. 1) may be transmitted in SIMO mode. In that case, the MIMO channel matrix $\hat{H}_{nm}^{0}[k]$ may be used to obtain a (vector) set of SIMO channel coefficients for proper demodulation of that portion of the packet. Specifically, at step 1028, a SIMO channel vector $\hat{H}_{nm}^{0}[k]$ is computed as:

$$\hat{H}_n[k] = \hat{H}_{n0}^{0}[k] + e^{j\delta k\theta} \hat{H}_{n1}^{0}[k], \qquad \text{(Eq. 49)}$$

where $\theta = (2\pi/64)$, k is the OFDM subcarrier index, and $\delta$ is the delay (in samples) applied to the OFDM symbol transmitted by the second (m=1) transmitter to achieve transmitter diversity.

It will be appreciated that processes 700 and 1000 are illustrative and that variations and modifications are possible. Steps described as sequential may be executed in parallel, order of steps may be varied, and steps may be modified or combined. The computations may be performed sequentially or in parallel for each receive antenna n. Any desired training sequence may be used, including sequence $L_2$ or $L_3$ shown in FIG. 4.

Process 700 or 1000 may also be adapted to a larger number of transmit antennas m by dividing the 64 available subcarriers (or other number of subcarriers) as equally as possible among the transmit antennas during the training period. It will be appreciated that for a sufficiently large number $M_t$ of transmit antennas, $64/M_t$ subcarriers might not provide enough information for a reliable channel estimation. In such embodiments, the training period may be extended by repeating the long training symbol (e.g., using different subsets of the transmit antennas for each repetition), or different antennas may transmit uncorrelated training sequences using the same subcarriers, or other techniques may be employed to improve reliability of the channel estimates.

Channel Variation Tracking

In some embodiments, channel tracking may be implemented to improve the robustness to channel variations during a packet caused by motion of the user or other changes in the environment as mentioned above. For example, as mentioned above, channel update module 338 of receiver system 304 (FIG. 3) may provide channel tracking and adaptive updating during reception of a packet.

Figure 10:
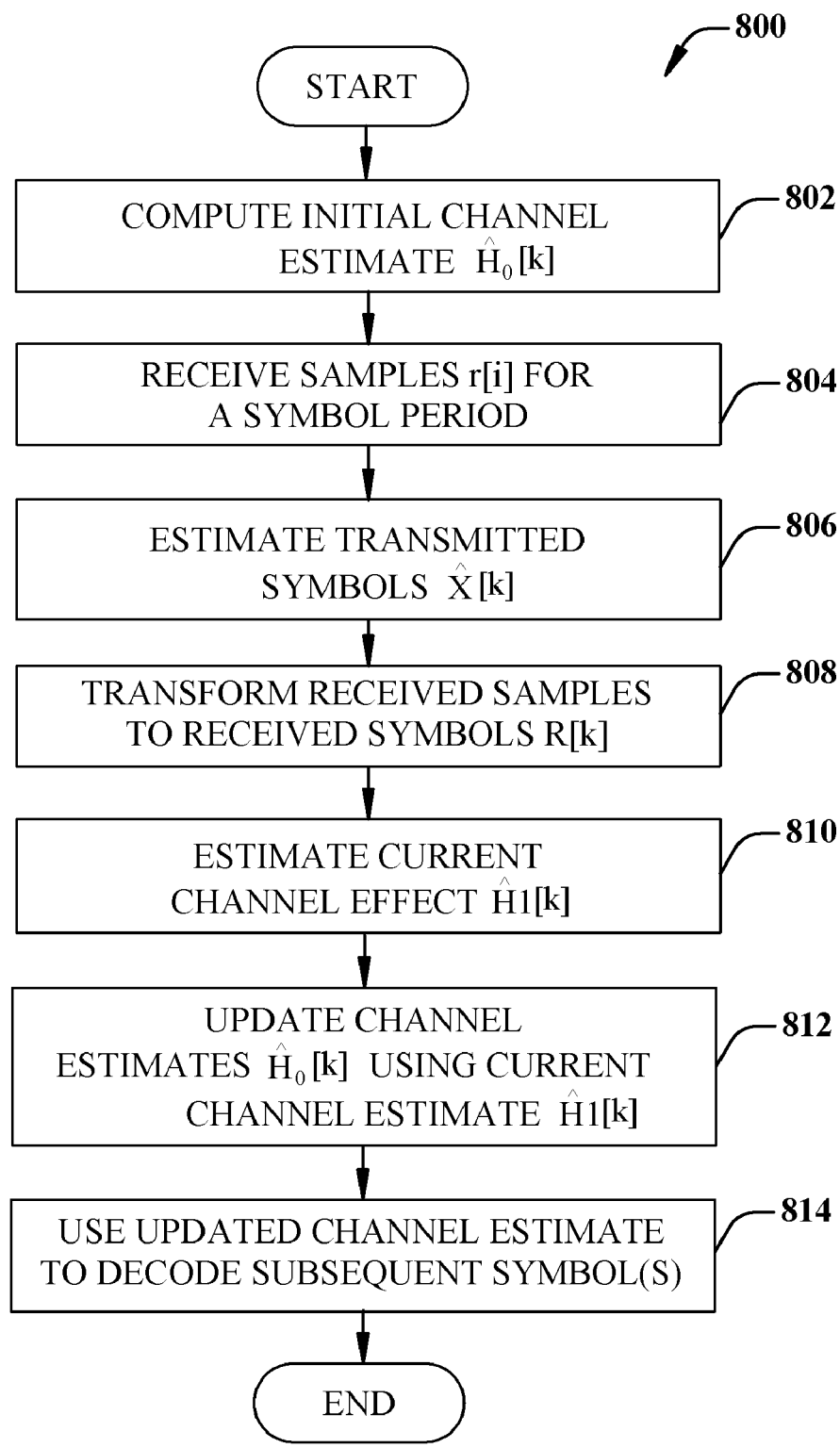
FIG. 10 is a flow diagram of a process for updating channel estimates during receipt of a packet according to an embodiment of the present invention.

FIG. 10 is a flow diagram of a process 800 for updating channel estimates during receipt of a packet. The process is described in the context of an 802.11a packet and a single-antenna receiver; extensions to other systems will be apparent.

At step 802, during the training period, an initial channel estimate $\hat{H}_0[k]$ is computed for each subcarrier k. Step 802 may include executing process 600 or 700 described above, or another channel estimation process.

At step 804, during receipt of the data portion of the packet, a sequence of samples r[i] corresponding to a symbol period is received. At step 806, this sequence of samples r[i] is used to estimate a transmitted symbol $\hat{X}[k]$ for each subcarrier k. Step 806 may be implemented using conventional decoding technologies and advantageously includes correcting for channel effects using initial channel estimate $\hat{H}_0[k]$.

At step 808, the samples r[i] for the symbol period are transformed to a set of received subcarrier coefficients R[k]; these coefficients will generally reflect the transmitted symbols as modified by channel effects. At step 810, a "current" channel estimate $\hat{H}_e[k]$ is computed as:

$$\hat{H}_e[k] = R[k]\hat{X}^{-1}[k]. \quad \text{(Eq. 50)}$$

At step 812, the current channel estimate can be used to update the initial channel estimate $\hat{H}_0[k]$, thereby providing an updated channel estimate $\hat{H}'[k]$. Various filters may be used to generate the updated channel estimate. For example, a first order filter:

$$\hat{H}'[k] = (1-\alpha)\hat{H}_0[k] + \alpha\hat{H}_e[k], \ 0 \leq \alpha \leq 1 \quad \text{(Eq. 51)}$$

may be applied. Since $\hat{H}_0[k]$ and $\hat{H}_e[k]$ will be similar to the extent that the channel properties have not changed since the training period, Eq. 51 may change the channel estimate only slightly (or not at all). The averaging constant $\alpha$ may be varied as desired; in one embodiment a value of $\alpha=0.125$ is advantageously used. More generally, the value of $\alpha$ may be optimized for a particular embodiment based on tradeoffs between sensitivity to actual changes in the channel properties and undesired responsiveness to transient fluctuations.

In other embodiments, updated channel estimate $\hat{H}'[k]$ may be computed using other finite or infinite impulse response filters, e.g., filters that average $\hat{H}_e[k]$ over a number of symbols to further reduce sensitivity to transient fluctuations in channel response.

At step 814, the updated channel estimate $\hat{H}'[k]$ is used to decode subsequent packets. Steps 804 to 812 may be performed again using updated channel estimate $\hat{H}'[k]$ in place of initial channel estimate $\hat{H}_0[k]$, thereby allowing the receiver to respond to further changes in channel properties.

For systems with multiple receive antennas, process 800 may be performed (sequentially or in parallel) for each receive antenna.

For extended rate systems implemented using MIMO, where different data symbols are transmitted simultaneously from different transmit antennas, the above technique can be used for every group of $M_t$ symbols, where $M_t$ is the number of transmit antennas. In one such embodiment, $\hat{\mathbb{H}}_0[k]$ is an $M_r \times M_t$ matrix with the channel coefficients for subcarrier k, $\hat{\mathbb{X}}[k]$ is an $M_t \times M_r$ matrix where each of the $M_r$ columns contains the $M_t$ estimated symbols (one per transmit antenna) transmitted for subcarrier k, and $\mathbb{R}[k]$ is a vector with $M_r$ complex values for all receivers for subcarrier k. Corresponding matrix operations can be substituted for the scalar operations in Eqs. 50 and 51.

While the invention has been described with respect to specific embodiments, one skilled in the art will recognize that numerous modifications are possible. For instance, the techniques described herein may be adapted to various OFDM communication systems and protocols and are not limited to any particular number or spacing of subcarriers. For example, FFTs and IFFTs with different numbers of points could be used, or time/frequency transform algorithms other than FFT, such as discrete cosine transforms or the like, could be substituted. The techniques may be implemented for use in systems with any number of transmit antennas and any number of receive antennas, some or all of which might be mobile. Devices implementing the channel estimation techniques described herein may also be configured for use in legacy 802.11a networks as well as extended rate networks and may be components of a "mixed" network in which legacy and extended rate devices coexist or interoperate.

The various functional blocks described herein may be implemented using hardware (e.g., suitable integrated circuit components), software (e.g., program instructions) executing on appropriate processing devices, or any combination thereof. In some embodiments, a single device may be implemented as a transceiver including both transmitter system and receiver system elements. In such devices, hardware and/or software components may be configured to perform both transmit and receive functions.

Thus, although the invention has been described with respect to specific embodiments, it will be appreciated that the invention is intended to cover all modifications and equivalents within the scope of the following claims.

What is claimed is:

1. A method for determining channel estimates at a receiver for a wireless communication system using orthogonal frequency division multiplexing (OFDM) over a plurality of OFDM subcarriers, the method comprising:
   receiving training signals from one or more receive antennas;
   computing an estimated channel impulse response from the received training signals by reference to a training sequence; and
   adaptively truncating the estimated channel impulse response in the time domain to improve a signal-to-noise ratio of the channel estimates.

2. The method of claim 1, wherein computing the estimated channel impulse response includes:
   transforming time-domain samples of the training signals to subcarrier coefficients for each of the plurality of OFDM subcarriers;
   converting the subcarrier coefficients to impulse coefficients using a training sequence; and
   transforming the impulse coefficients to obtain the channel impulse response estimate in the time domain.

3. The method of claim 2, wherein the training sequence includes
   a zero component for a DC one of the plurality of OFDM subcarriers, and wherein converting the subcarrier coefficients to impulse coefficients includes interpolating the impulse coefficients for the OFDM subcarriers other than the DC subcarrier, thereby supplying an impulse coefficient at DC.

4. The method of claim 2, wherein the training sequence includes a zero component for a DC one of the plurality of OFDM subcarriers, the method further comprising:
subsequently to transforming the impulse coefficients to obtain the channel impulse response estimate in the time domain, estimating a DC offset from a plurality of samples near the tail of the time domain channel impulse response estimate; and
correcting the time domain channel impulse response estimate for the estimated DC offset.

5. The method of claim 1, wherein adaptively truncating the estimated channel impulse response includes:
computing a channel power function representing power received near a sample time;
estimating channel noise;
computing a cutoff time based on the channel power function and the channel noise estimate;
truncating the time domain channel impulse response estimate at the cutoff time; and
transforming the truncated time domain channel impulse response estimate to a frequency domain channel estimate.

6. The method of claim 5, wherein the channel power function is given by:

$$P_h[t] = \sum_{i=0}^{i_0} \sum_{n=0}^{M_r-1} \left\| \hat{h}_n^0[(i+t) \bmod N] \right\|^2,$$

where:
t is a time parameter measured in samples;
$M_r$ is the number of receive antennas;
$\hat{h}_{n0}[i]$ is the time domain channel impulse response estimate;
N is the number of samples in a symbol period of the training sequence; and
$i_0$ is a filtering time.

7. The method of claim 6, wherein the channel noise is estimated by minimizing P $P_h[t]$ over the time parameter t.

8. The method of claim 5, wherein truncating the time domain channel impulse response estimates includes applying a windowing function around the cutoff time.

9. The method of claim 5, wherein truncating the time domain channel impulse response estimate includes applying a timing correction determined from the channel power function.

10. The method of claim 9, wherein the timing correction is given by $\tau'$=arg max $P_h[t]$, where $P_h[t]$ is the channel power function and the maximization is performed over all values of time parameter t.

11. The method of claim 10, wherein applying the timing correction includes cyclically shifting each of the time domain channel response estimate and the power function by $\tau'$ samples.

12. The method of claim 1, wherein the receiver is configured to receive packets complying with IEEE-802.11a.

13. The method of claim 1, wherein the receiver includes a plurality of receive antennas and wherein the steps of receiving, computing, and adaptively truncating are performed for each of the receive antennas.

14. The method of claim 1, wherein adaptively truncating comprises filtering the estimated channel impulse response using a window filter in the time domain.

15. The method of claim 1, wherein the receiver is configured to receive packets complying with IEEE 802.11a.

16. The method of claim 1, wherein the receiver is configured to receive packets complying with IEEE 802.11.

17. The method of claim 5, wherein truncating the time domain channel impulse response estimate includes applying a timing correction determined from the channel power function.

18. A method of channel estimation for a receiver of a multiple input, multiple output (MIMO) communication system wherein signals are transmitted using orthogonal frequency division multiplexing (OFDM) over a plurality of OFDM subcarriers, the method comprising:
receiving, at each of a plurality of receive antennas, training signals from a plurality of transmit antennas, wherein the signal from each transmit antenna includes a different subset of the plurality of OFDM subcarriers;
transforming the received training signals at each receive antenna to a plurality of impulse coefficients for that receive antenna, each impulse coefficient corresponding to a different one of the OFDM subcarriers;
for each of the receive antennas, computing a channel impulse response for one of the transmit antennas using the impulse coefficients for the subset of the OFDM subcarriers transmitted by the one of the transmit antennas; and
adaptively truncating the time domain channel impulse response estimate to improve the signal-to-noise ratio of the channel estimates.

19. The method of claim 18, wherein computing a channel impulse response for one of the transmit antennas includes:
transforming time-domain samples of the training signals to subcarrier coefficients for each of the plurality of OFDM subcarriers;
converting the subcarrier coefficients to impulse coefficients using a training sequence;
transforming the impulse coefficients to a channel impulse response estimate in the time domain.

20. The method of claim 19, wherein the training sequence includes a zero component for a DC one of the plurality of OFDM subcarriers, and wherein converting the subcarrier coefficients to impulse coefficients includes interpolating the impulse coefficients for the OFDM subcarriers other than the DC subcarrier, thereby supplying an impulse coefficient at DC.

21. The method of claim 19, wherein the training sequence includes a zero component for a DC one of the plurality of OFDM subcarriers, the method further comprising:
subsequently to transforming the impulse coefficients to obtain the channel impulse response estimate in the time domain, estimating a DC offset from a plurality of samples near the tail of the time domain channel impulse response estimate; and
correcting the time domain channel impulse response estimate for the estimated DC offset.

22. The method of claim 19, wherein adaptively truncating the time domain channel impulse response estimate includes:
computing a channel power function representing power received near a sample time;
estimating channel noise;
computing a cutoff time based on the channel power function and the channel noise estimate;
truncating the time domain channel impulse response estimate at the cutoff time; and transforming the truncated time domain channel impulse response estimate to a frequency domain channel estimate.

23. The method of claim 22, wherein the channel power function is given by:

$$P_h[t] = \sum_{i=0}^{i_0} \sum_{n=0}^{M_r-1} \sum_{m=0}^{M_r-1} \left| \hat{h}_{nm}^0[(i+t) \bmod N] \right|^2,$$

where
- t is a time parameter measured in samples;
- $M_r$ is the number of receive antennas;
- $M_t$ is the number of transmit antennas;
- $\hat{h}_{n0}[i]$ is the time domain channel impulse response estimate;
- N is the number of subcarriers transmitted by one transmit antenna during the training sequence; and
- $i_0$ is a filtering time.

24. The method of claim 23, wherein the channel noise is estimated by minimizing $P_h[t]$ over the time parameter t.

25. The method of claim 22, wherein truncating the time domain channel impulse response estimate includes applying a timing correction determined from the channel power function.

26. The method of claim 25, wherein the timing correction is given by $\tau' = \arg\max P_h[t]$, where $P_h[t]$ is the channel power function and the maximization is performed over all values of time parameter t.

27. The method of claim 26, wherein applying the timing correction includes cyclically shifting each of the time domain channel response estimate and the power function by $\tau'$ samples.

28. The method of claim 18, wherein the signals comprise packets complying with IEEE 802.11a.

29. The method of claim 18, wherein the signals comprise packets complying with IEEE 802.11.

30. A method of tracking channel variations during receipt of a packet using one or more receive antennas, comprising:
- determining an initial channel estimate from training data included in the packet;
- identifying a received symbol in the packet, wherein the received symbol corresponds to an input symbol value that is not part of a training sequence;
- estimating the input symbol value using the received symbol value and the initial channel estimate;
- deriving a per-symbol channel estimate from the received symbol value and the estimated input symbol value; and
- updating the initial channel estimate using the per-symbol channel estimate.

31. The method of claim 30, wherein updating the initial channel estimate includes applying a first order filter to the initial channel estimate and the per-symbol channel estimate.

32. The method of claim 30, wherein the packet is transmitted using a plurality of transmit antennas and received using a plurality of receive antennas, and wherein channel estimates are derived as a matrix for respective channels between each of the transmit antennas and each of the receive antennas.

33. The method of claim 30, wherein the packet is transmitted using orthogonal frequency division multiplexing (OFDM) over a plurality of OFDM subcarriers and wherein channel variations are tracked for each of the OFDM subcarriers.

34. The method of claim 30, wherein the signals comprise packets complying with IEEE 802.11a.

35. The method of claim 30, wherein the signals comprise packets complying with IEEE 802.11.

36. A method for determining channel estimates at a receiver for a wireless communication system using orthogonal frequency division multiplexing (OFDM) over a plurality of OFDM subcarriers, the method comprising:
- receiving training signals from one or more receive antennas;
- computing an estimated channel response from the received training signals by reference to a training sequence; and
- adaptively truncating the estimated channel response in the frequency domain to improve a signal-to-noise ratio of the channel estimates.

37. The method of claim 36, further comprising updating the estimated channel response within a packet based on received data symbols of the packet.

38. The method of claim 36, further comprising:
- after determining an initial channel estimate from the received training signals included in a packet, identifying a received OFDM data symbol in the packet;
- estimating an input OFDM data symbol value using the received OFDM data symbol value and the initial channel estimate;
- deriving a per-OFDM symbol channel estimate from the received OFDM data symbol value and the estimated input OFDM data symbol value; and
- updating the initial channel estimate using the per-OFDM symbol channel estimate.

39. The method of claim 36, wherein adaptively truncating comprises truncating an estimated channel impulse response in the time domain and transforming the truncated channel impulse response estimate to the frequency domain.

40. The method of claim 36, wherein adaptively truncating comprises filtering an estimated channel impulse response using a window filter in the time domain and transforming the filtered channel impulse response estimate to the frequency domain.

41. The method of claim 36, wherein the receiver is configured to receive packets complying with IEEE 802.11a.

42. The method of claim 36, wherein the receiver is configured to receive packets complying with IEEE 802.11.

43. The method of claim 36, wherein adaptively truncating the estimated channel response includes:
- computing a channel power function representing power received near a sample time;
- estimating channel noise;
- computing a cutoff time based on the channel power function and the estimated channel noise;
- truncating the estimated channel impulse response in the time domain at the cutoff time; and
- transforming the truncated time domain channel impulse response estimate to a frequency domain channel estimate.

44. The method of claim 43, wherein the receiver is configured to receive packets complying with IEEE 802.11a.

45. The method of claim 43, wherein the receiver is configured to receive packets complying with IEEE 802.11.

46. A method of channel estimation for a receiver of a multiple input, multiple output (MIMO) communication system wherein signals are transmitted using orthogonal frequency division multiplexing (OFDM) over a plurality of OFDM subcarriers, the method comprising:
- receiving, at each of a plurality of receive antennas, training signals from a plurality of transmit antennas, wherein the training signals comprise both an IEEE 802.11a standard preamble and a MIMO preamble;

transforming the received training signals at each receive antenna to a plurality of impulse coefficients for that receive antenna, wherein the plurality of impulse coefficients depend, at least in part, on the received MIMO preamble; and for each of the receive antennas, computing a channel impulse response for one of the transmit antennas using the impulse coefficients, wherein computing a channel impulse response includes adaptively truncating the channel impulse response in the frequency domain.

47. The method of claim 46, wherein the training signals are training symbols arranged such that a legacy receiver can interpret the IEEE 802.11a standard preamble.

48. The method of claim 46, wherein the training signals are training symbols arranged such that the MIMO preamble is transmitted following in time after the IEEE 802.11a standard preamble.

49. The method of claim 46, wherein the MIMO preamble is transmitted over all transmitters using all subcarriers that are used for data.

50. The method of claim 46, wherein the receiver receives the training signals from one of the transmit antennas while other transmit antennas are not transmitting.

51. The method of claim 50, wherein the training signals from the one of the individual transmit antennas are IEEE 802.11a standard preambles.

52. The method of claim 46, wherein the MIMO preamble includes two or more iterations of an IEEE 802.11a standard long training symbol.

53. The method of claim 52, wherein the number of iterations is at least equal to the number of transmit antennas.

54. The method of claim 52, wherein the number of iterations is inversely proportional to the number of subcarriers used per transmit antenna.

55. The method of claim 52, wherein the number of iterations is a number sufficient to provide enough information for a reliable channel estimation.

56. The method of claim 52, wherein the iterations are uncorrelated over different transmit antennas for each iteration.

57. A method for transmitting, using a transmitter having a plurality of transmit antennas, training signals in a wireless communication system for use in determining channel estimates at a receiver for a wireless medium using orthogonal frequency division multiplexing (OFDM) over a plurality of OFDM subcarriers, the method comprising:

transmitting, at each of a plurality of transmit antennas, training signals comprising both an IEEE 802.11a standard preamble and a MIMO preamble, wherein the MIMO preamble is a preamble transmitted over two or more of the transmit antennas.

58. The method of claim 57, wherein the training signals are training symbols arranged such that a legacy receiver can interpret the IEEE 802.11a standard preamble.

59. The method of claim 57, wherein the MIMO preamble is transmitted following in time after the conventional 802.11a preamble.

60. The method of claim 57, wherein the MIMO preamble is transmitted over all transmitters using all subcarriers that are used for data.

61. The method of claim 57, wherein at least one transmit period exists during which one transmit antenna transmits its training signals while all other transmit antennas do not transmit signals.

62. The method of claim 61, wherein the training signals from the one transmit antenna comprise an IEEE 802.11a standard preamble.

63. The method of claim 57, wherein the MIMO preamble comprises, among possibly other fields, two or more iterations of an IEEE 802.11a standard long training symbol.

64. The method of claim 63, wherein the number of iterations is at least equal to the number of transmit antennas.

65. The method of claim 63, wherein the number of iterations is inversely proportional to the number of subcarriers used per transmit antenna.

66. The method of claim 63, wherein the number of iterations is a number sufficient to provide enough information for a reliable channel estimation.

67. The method of claim 63, wherein the iterations are uncorrelated over different transmit antennas for each iteration.

68. A method for transmitting, using a transmitter having at least one transmit antenna, training signals in a wireless communication system for use in determining channel estimates at a receiver for a wireless medium using orthogonal frequency division multiplexing (OFDM) over a plurality of OFDM subcarriers, the method comprising:

transmitting, using the at least one transmit antenna, one or more training symbols usable by a receiver to estimate a channel response over a legacy set of OFDM subcarriers; and transmitting, using the at least one transmit antenna, one or more additional training symbols usable for estimating channel response over an additional set of OFDM subcarriers.

69. The method of claim 68, wherein the legacy set of OFDM subcarriers consists of the 52 subcarriers defined by the IEEE-802.11a standard.

70. The method of claim 68, wherein the additional set of OFDM subcarriers comprises four subcarriers.

71. The method of claim 68, wherein the training symbols transmitted over the legacy set of OFDM subcarriers are transmitted in a SIMO mode.

72. The method of claim 71, wherein the number of transmit antennas is two or more and training signals transmitted over the legacy set of OFDM subcarriers are distinct over at least two of the transmit antennas.

73. A method for determining channel estimates at a receiver for a wireless communication system using orthogonal frequency division multiplexing (OFDM) over a plurality of OFDM subcarriers, the method comprising:

receiving training signals from one or more receive antennas;

computing an estimated channel impulse response from the received training signals by reference to a training sequence, wherein the training sequence for each transmit antenna is such that the training symbols sent from any two of the plurality of transmit antennas differ only in a cyclic shift and the receiver is configured to receive such signals; and adaptively truncating the estimated channel impulse response in the frequency domain.

* * * * *